(12) United States Patent
Marrder et al.

(10) Patent No.: US 9,776,653 B2
(45) Date of Patent: Oct. 3, 2017

(54) SKI BIKE WITH MULTIPLE STEERING COMPONENTS

(71) Applicants: Obed Marrder, Sandy, UT (US); Nicolas Chase Wagstaff, Sandy, UT (US); Kevin F. Schneidle, South Jordan, UT (US)

(72) Inventors: Obed Marrder, Sandy, UT (US); Nicolas Chase Wagstaff, Sandy, UT (US); Kevin F. Schneidle, South Jordan, UT (US)

( * ) Notice: Subject to any disclaimer, the term of this patent is extended or adjusted under 35 U.S.C. 154(b) by 0 days.

(21) Appl. No.: 14/841,497

(22) Filed: Aug. 31, 2015

(65) Prior Publication Data
US 2017/0057534 A1    Mar. 2, 2017

(51) Int. Cl.
| | | |
|---|---|---|
| B62B 15/00 | (2006.01) | |
| B62B 13/08 | (2006.01) | |
| B62B 17/04 | (2006.01) | |
| B62B 17/06 | (2006.01) | |
| B62B 17/00 | (2006.01) | |

(52) U.S. Cl.
CPC ............ *B62B 15/00* (2013.01); *B62B 17/005* (2013.01); *B62B 17/04* (2013.01); *B62B 17/061* (2013.01); *B62B 17/065* (2013.01)

(58) Field of Classification Search
CPC ..... B62B 15/00; B62B 17/061; B62B 17/065; B62B 17/005; B62B 17/04; B62B 17/02; B62B 13/02; B62B 13/08; B62B 13/12
See application file for complete search history.

(56) References Cited

U.S. PATENT DOCUMENTS

| | | | | | |
|---|---|---|---|---|---|
| 3,398,970 | A | * | 8/1968 | Horiuchi | B62B 13/12 280/16 |
| 3,799,565 | A | * | 3/1974 | Burtis | B62B 13/12 180/182 |
| 3,915,468 | A | * | 10/1975 | Hoareau | B62M 27/02 280/12.1 |
| 4,023,824 | A | * | 5/1977 | von Besser | A63C 9/0841 280/618 |
| 2007/0257452 | A1 | * | 11/2007 | Stene-Johansen | B62B 13/12 280/16 |
| 2009/0058023 | A1 | * | 3/2009 | Spencer | B62B 13/12 280/14.28 |
| 2009/0140503 | A1 | * | 6/2009 | Kolesar | B61B 11/008 280/16 |
| 2015/0353117 | A1 | * | 12/2015 | Peng | B62B 17/062 280/14.21 |

* cited by examiner

*Primary Examiner* — Frank B Vanaman
(74) *Attorney, Agent, or Firm* — Steven Rinehart

(57) ABSTRACT

A ski bike for gliding across a slick surface that dampens shock forces on skis and provides precise maneuverability on a slick surface. The ski bike is configured to turn through either: a rotatable handle bar sub assembly, by shifting the weight of the rider, or through a carving technique involving digging the skis into snow and following the formed carved path to turn. The ski bike dampens shock forces on the skis through a dampener that absorbs shock forces from a front ski, a front shock pivot mount that that enables lateral pivoting to absorb lateral shock forces, and a swing arm tower that enables lateral pivoting of a pair of rear skis. A stomp plate provides stability by gripping footwear of a rider and enabling passage of moisture. A frame includes a lift bar that enables the ski bike to be lifted by ski lift.

9 Claims, 11 Drawing Sheets

SKI BIKE WITH MULTIPLE STEERING COMPONENTS

BACKGROUND OF THE INVENTION

Field of the Invention

This invention relates to a ski bike and more particularly to a downhill ski bike operably by a rider in a standing position.

Description of the Related Art

Downhill ski biking involves a rider mounted vehicle (a ski bike) that typically comprises a frame; a steering mechanism, and a seat, and a frame. Typically, front and rear skis couple to the frame for riding over a snow covered slope. The rider is able to sit on the ski bike and enjoyably coast down the slope.

Generally, the surface on which ski bikes operate is slick, such as snow covered mountains or ice blanketed ponds. This makes steering and maneuverability difficult. Riders are not always able to bite or grip the surface with ski edging well enough to maneuver efficiently, creating dangerous conditions for riders facing paths blocked with trees, oncoming skiers, rocks, depressions, uneven or soft snow, and other obstacles. The consequential vibrations and shock forces that travel from the blades of the ski bike up to the rider can be hard on the body, or worse, cause the rider to lose control of the ski bike.

Ski bikes are designed to be operated as light weight vehicles without a motor for propulsion and to rely solely on gravity, the weight of the rider, and minimal friction from the snow or ice, to move. Thus, proper shocks are not feasible to add to the blades and frame of the ski bike. For, if the shocks and dampeners were added, the additional weight would make the ski bike too cumbersome and heavy to operate efficiently.

There exists a need in the art for a ski bike that dampens shock forces on skis and provides multiple steering components for precise maneuverability on a slick surface. Accordingly, there is a need to provide a ski bike that glides across a slick surface while mounted and operated by a rider in a standing position, dampens lateral and axial shock forces through a dampener, a front shock pivot mount, and a swing arm tower, and provides precise maneuverability through a rotatable handle bar sub assembly, shifting of center of mass, and curved edges on the skis that enable carving techniques. Current ski bikes are not effective.

SUMMARY OF THE INVENTION

From the foregoing discussion, it should be apparent that a need exists for ski bike that dampens shock forces on the skis and provides multiple steering components for multiple steering components for enabling precise maneuverability on a slick surface. Beneficially, such an apparatus would overcome many of the difficulties and safety concerns expressed, by providing a ski bike that is portable so as to be lifted to a high elevation, operable from a standing position, operable to glide on a slick surface, maneuverable by various steering means, and multi-jointed so as to dampen shock forces during operation.

The present invention has been developed in response to the problems and needs in the art that have not yet been fully solved by currently available apparati and methods. Accordingly, the present invention has been developed to provide a ski bike for use in snow and ice.

In some embodiments, the ski bike glides across a slick surface while mounted and operated by a rider in a standing position. The ski bike utilizes a front ski and a pair of rear skis to engage the slick surface. The skis are configured to reduce friction and enable precise turning and maneuverability. The skis are also attached to a frame through a dampener, a front shock pivot mount, and a swing arm tower that absorb shock forces and enable lateral pivoting of the skis, such that axial and lateral shock forces on the skis are dampened.

The ski bike can be steered to turn in various ways. In one embodiment, a rotatable handle bar sub assembly directly controls the direction of the front ski. In another embodiments, the center of mass by the rider can be shifted to turn the ski bike. In yet another embodiment, the skis have curved edges that enable turning through a carving technique involving digging the skis into the slick surface and following the carved path in that direction.

A stomp plate is disposed directly above the rear skis to provide additional stability by gripping foot wear of a rider and enabling passage of moisture. The frame has an attached lift bar that enables the ski bike to be lifted by a ski lift.

In one embodiment, the ski bike may include a frame for support and rigidity; a handle bar sub assembly for steering; a front ski, a fork for attaching the front ski to the handle bar sub assembly; a dampener for absorbing shock forces from the front ski; a pair of rear skis for gliding and maneuvering over a the slick slope; a stomp plate on each rear ski for providing a textured surface for a rider to stand; and a lift bar attached to the frame for coupling the ski bike to a ski lift. Each component is coupled to the frame, which serves as a foundation point.

The handle bar sub assembly and curvature of the skis are configured to enable multiple means for steering and braking on a slick surface. The ski bike comprises a versatile and steerable handle bar sub assembly which provides steering control through rotation of the handle bar sub assembly in conjunction with shifting weight displacement of the rider. The handle bar sub assembly rests directly in front of the rider above the frame. The handle bar sub assembly operatively connects to the front ski to enable turning left and right. Due to compaction of snow, the rider's weight may be shifted in a coordinated effort with the handle bar sub assembly to provide optimal turning.

In addition to the steerable handle bar assembly, the front and rear skis are curved and sufficiently flexible, so as to enable turning on the slick surface. Specifically, the curved configuration of the skis enables the rider to perform carving maneuvers. Those skilled in the art will recognize that carving is where the edges of the skis cut into snow so deeply, that the skis do not slide sideways, but rather travel straight along their length.

Thus, because the edges on the front and rear skis are curved they cut into the snow in a slight arc. The skis then follow the edges and this allows for a turning motion for the ski bike. This provides the rider with an efficient means to turn, as the least amount of snow is being moved while turning, and the largest reaction force from the snow is possible due to the grip of the edges of the skis. Thus, by taking advantage of the handle bar sub assembly, shifting weight displacement, and the curved configuration of the skis, the rider has numerous steering means.

The ski bike also provides centering and damping forces to moderate the steering behavior. A dampener is disposed between the fork and the front ski, and may include a spring that help absorbs shock forces from the ride to allow for a smoother ride. A front shock pivot mount is configured to enable lateral pivoting of the front ski to at least partially dampen shock forces on the front ski during operation of the ski bike. The pair of rear skis also dampen shock forces through a swing arm tower. The swing arm tower is configured to pivotally join with the pair of rear skis.

A rider operates the ski bike while standing. Those skilled in the art will recognize that this upright posture while maneuvering the ski bike on a slick surface can be dangerous when considering the snow and ice that may accumulate on components of the ski bike. The stomp plate provides additional stability to the rider during operation of the ski bike by providing secure footing for the rider. For example, the textured configuration of the stomp plate grips the bottom of the rider's footwear and enables passage of ice and snow through holes in the stomp plate.

As described above, the ski bike is lightweight and portable. Those skilled in the art will recognize that the ski bike is especially useful on mountains having snow and skiing functions. A lift bar attaches to the frame of the ski bike. The lift bar is configured to enable the ski bike to be carried to peaks on a slope through quick-release coupling mechanism to a ski lift. Thus, by utilizing the novel features of the ski bike, even a novel rider is able to easily stand and operate the ski bike while coasting down a slick slope.

These features and advantages of the present invention will become more fully apparent from the following description and appended claims, or may be learned by the practice of the invention as set forth hereinafter

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
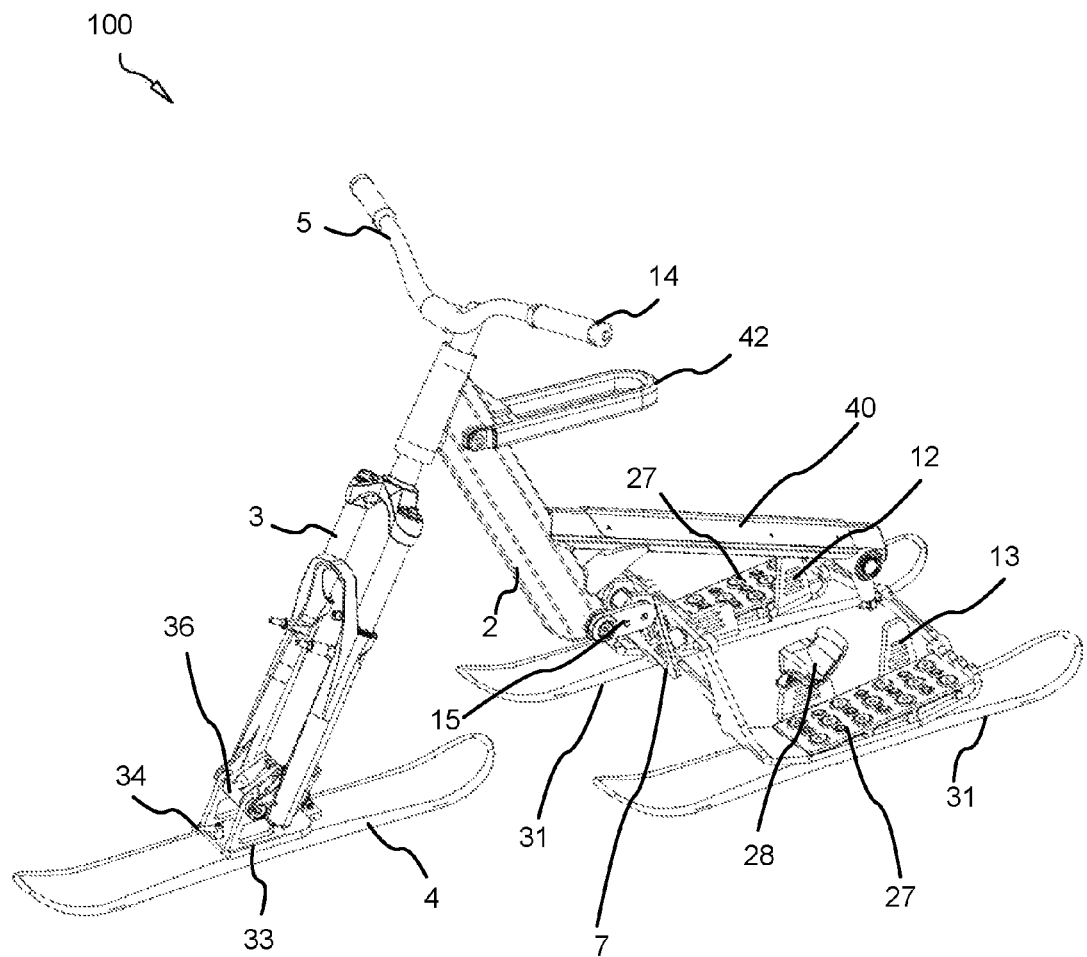
FIG. 1A is an elevational frontal-side perspective view of a ski bike in accordance with the present invention.

FIG. 1A is an elevational frontal-side perspective view of a ski bike 100 in accordance with the present invention. As can be seen from FIG. 1A, the ski bike 100 is configured to glide across a slick surface while being mounted and operated by a rider in a standing position. The ski bike 100 is configured to dampen axial and lateral shock forces, and provide multiple steering components for precise maneuverability on a slick surface. The slick surface on which the ski bike 100 glides on may include, without limitation, a snow covered slope, a sheet of ice, and a high viscosity-low frictional surface.

The ski bike 100 utilizes a front ski 4, and a pair of rear skis 31 to glide atop the slick surface. The skis 4, 31 are configured to reduce friction, such that gravity and the weight of the rider are the forces that substantially propel the ski bike 100 along the slick surface. The skis 4, 31 are also configured to turn and to have curved edges, such that precise turning and maneuverability is possible. The skis 4, 31 are also attached to a frame 2 through a dampener 38, a front shock pivot mount 36, and a swing arm tower 7 that absorb both axial and lateral shock forces and enable lateral pivoting of the skis 4, 31, such that axial and lateral shock forces on the skis are dampened.

In one embodiment, the ski bike 100 is operational by a rider in a standing position. The weight and adjustable center of mass of the rider, along with the low friction caused by the slick surface creates the momentum for propelling the ski bike 100. In a downhill slope, gravity also serves to propel the ski bike 100. Further, a front ski 4 and a pair of rear skis 31 are curved such that minimal friction is created with the slick surface. Consequently, the ski bike 100 does not require a motor or electrical components for propulsion.

A stomp plate 27 provides additional stability while operating the ski bike 100 by gripping foot wear of a rider, and enabling passage of moisture that may cause slippage to the rider. The stomp plate rests directly over the rear skis 31, where the center of mass from the rider is greatest. The stomp plate 27 may have various patterns, protrusions, and depressions configured to grip footwear and allow passage of moisture; whereby slippage is minimized. The ski bike 100 is supported by a lightweight, rigid frame 2. In one embodiment, a lift bar 42 attaches directly onto a center section of the frame 2 to enable the ski bike 100 to be lifted by a ski lift.

As explained above, the ski bike 100 is configured to dampen axial and lateral shock forces on the front ski 4 through a dampener 38 that absorbs impact and shock forces exerted on the front ski 4. The dampener 38 may include a spring that compresses to absorb energy from shock forces. Further, a front shock pivot mount 36 enables lateral pivoting of the front ski 4 to dampen lateral shock forces. Similarly, for the rear skis 31, a swing arm tower 7 enables lateral pivoting of a pair of rear skis 31 to dampen lateral shock forces on the rear end of the frame 2.

As explained above, the ski bike 100 is configured to provide precise turning and maneuverability on slick surfaces. In one embodiment, a rotatable handle bar sub assembly 5 enables a rider to rotate a front ski 4 in a desired direction. In another embodiment, the rider's weight may be shifted to turn in the shifted direction. In another turning means, a carving technique involving digging the skis into the slick surface and following the carved path in that direction.

The ski bike 100 is configured to steer through turns by use of multiple steering means. In one embodiment, the rider grips 14 the handle bar sub assembly 5 and turns in the desired direction, either left or right. In another embodiment, the rider may shift weight distribution, and center of mass by leaning to the left or right, so as to yaw in that direction. In yet another embodiment, the rider exerts a force on the curved edges of the skis to carve a path in the slick surface, i.e., snow. This serves to cut the edges of the skis into the slick surface and the skis 4, 31 follow the path cut into the slick surface. In any case, the ski bike 100 is relatively easy and precise to steer, even for a novice rider. The dampening and steering components work together to enhance the stability of the ski bike 100 during operation.

The ski bike 100 is also lightweight and portable, providing quick release coupling means to attach to a ski lift, for example. In this manner, the rider is able to reach an elevated peak on a slope and enjoyably coast down the slope with great stability and maneuverability.

Looking again at FIG. 1A, the ski bike 100 comprises a lightweight frame 2 for support and rigidity; a handle bar sub assembly 5 for rotatable steering; a front ski 4; a fork 3 for attaching the front ski 4 to the handle bar sub assembly 5; a dampener 38 for absorbing shock forces from the front ski 4; a pair of rear skis 31 for gliding and maneuvering over a the slick slope; a stomp plate 27 on each rear ski for providing a textured surface for a rider to stand; and a lift bar 42 attached to the frame 2 for coupling the ski bike 100 to a ski lift.

The frame 2 is defined by a front end and a rear end. The front end orients towards a forward direction of propulsion. The front end includes a tube 48 that is shaped and dimensioned to snugly receive a mount pole of the handle bar sub assembly 5. The rear end includes a pair of horizontal tubes 50 that attach to the pair of rear skis 31. In one embodiment, a spine guard 40 covers the frame 2 to provide additional protection and rigidity. The frame 2 is generally lightweight, and may be constructed from various materials known in the bicycling and skiing arts, including, without limitation, aluminum, titanium, steel, fiberglass, and metal alloys.

The frame 2 forms the central support for the front ski 4, and the pair of rear skis 31. The skis 4, 31 have a front support surface and a rear support surface that support the rider. The skis 4, 31 also have a front gliding surface and a rear gliding surface that engage the slick surface. The skis 4, 31 are substantially elongated, and have a generally smooth gliding surface to reduce friction on the slick surface.

In one embodiment, the support surface for the skis 4, 31 supports a ski mount side plate 33 for the front ski 4, and a first ski mount 12 and a second ski mount 13 for the pair of rear skis 31. The ski mount side plate 33 rests coplanar to the support surface of the front ski 4. The first ski mount 12 and the second ski mount 13 rest coplanar to the rear skis 31, with each ski mount 12, 13 supporting a stomp plate 27.

A free board binding 28 extends from the first ski mount 12 and the second ski mount 13 to provide lateral support to ankles or footwear worn by the rider. The free board binding 28 may include a padded circular member that is shaped and dimensioned to receive the ankle area of a leg or footwear. A free board binding mount 29 detachably attaches the free board binding 28 to the respective first and second ski mounts 12, 13.

The front and rear skis 4, 31 are curved at a slight arc at the edges to help with turning, especially while using a carving technique in which the skis dig into snow and follow the cut path during the turn. The curved edge may be adapted for different types of slick surfaces engaged by the skis 4, 31. In one possible embodiment, the gliding surface of the skis 4, 31 may be coated with a wax to enhance the gliding functionality by further reducing friction with the slick surface.

The front ski 4 attaches to the fork 3 through a front ski mount side plate 33. A dampener 38 positions between the fork 3 and the front ski mount side plate 33 to absorb axial shock forces from the front ski 4. The dampener 38 may include a spring that compresses to disperse energy from the shock forces on the front ski 4.

The pair of rear skis 31 attach directly to the frame 2 through a first control arm 9 and a second control arm 10. The control arms 9, 10 attach to a first ski mount 12 and second ski mount 13 that rest coplanar on the support surface of the rear skis 31. The first control arm 9 and the second control arm 10 are angled such that the rear skis 31 are angled upwards relative to the slick surface. This angled disposition also serves to dampen shock forces on the rear skis 31.

As described above, the ski bike 100 comprises a versatile and steerable handle bar sub assembly 5 which provides steering control through rotation of the handle bar sub assembly 5 in conjunction with shifting weight displacement of the rider. The handle bar sub assembly 5 extends from the front end of the frame 2. The handle bar sub assembly 5 enables steering of the ski bike 100. The handle bar sub assembly 5 operatively connects to the front ski 4, turning the front ski 4 to a desired direction, either left or right. The handle bar sub assembly 5 rests directly in front of the rider above the frame 2. A pair of grips 14 provide a gripping surface at the termini of the handle bar sub assembly 5.

In one embodiment, the handle bar sub assembly 5 operatively connects to the front ski 4 to enable turning left and right by gripping a pair of grips 14 at the termini of the handle bar sub assembly 5. Due to compaction of snow, the rider's weight may be shifted in a coordinated effort with the handle bar sub assembly 5 to provide optimal turning. The handle bar sub assembly 5 may also be pulled back or pushed down to control maneuvers by the ski bike 100.

In addition to the steering means offered by the handle bar sub assembly 5, the front and rear skis 4, 31 are curved and sufficiently flexible, so as to enable turning the ski bike 100 with a carving technique. Specifically, the curved edges of the skis 4, 31 enable the rider to perform carving turn maneuvers in snow. Those skilled in the art will recognize that carving is where the edges of the skis 4, 31 cut into the snow so deeply, that the skis 4, 31 do not slide sideways, but rather travel straight along the length of the cut, and in the direction of the cut.

Thus, because the edges on the front and rear skis 4, 31 are curved the skis easily cut into the snow at an arc-shaped path. The skis 4, 31 then follow the edges and this allows for a turning motion for the ski bike 100. This provides the rider with an efficient means to turn, as the least amount of snow is being moved while turning, and the largest reaction force from the snow is possible due to the grip of the edges of the skis 4, 31. The carving technique may be used in conjunction with the handle bar sub assembly 5 and the shifting center of mass to provide the most optimal turns and maneuvers.

Those skilled in the art will recognize that angulation could also be used for steering. In angulation, the rider's center of mass is over the center of the turn. Thus, when carving properly and leaning into the turn, the rider's weight is transferred to the middle of the rear skis 31. Thus, by taking advantage of the handle bar sub assembly 5, shifting weight displacement, and the curved configuration of the skis 4, 31, the rider has numerous steering means with the ski bike 100.

Yet another novel feature of the ski bike 100 are the dampener 38 and front shock pivot mount 36 that provide centering and damping forces to moderate the steering behavior. The dampener 38 is disposed between the fork 3 and the front ski 4, and may include a spring that absorbs shock from the ride to allow for a smoother ride. The front shock pivot mount 36 is disposed at the fork 3 and front end of the frame 2 to enable lateral pivoting motion of the front ski 4. In one embodiment, a front shock clevis 39 detachably attaches the front shock pivot mount 36 to the front ski mount side plate 33.

In addition to the front ski 4, the shock forces on the rear skis 31 are also dampened through the swing arm tower 7. The swing arm tower 7 is configured to pivotally join with the pair of rear skis 31. The swing arm tower 7 laterally pivots the pair of rear skis 31 to at least partially dampen shock forces. The swing arm tower 7 pivots in relation to the shaft link tower 8. A coil 17 helps regulate the pivoting motion by the swing arm tower 7.

In one embodiment, the rider operates the ski bike 100 while standing. Those skilled in the art will recognize that this upright posture while maneuvering the ski bike 100 on a slick surface can be dangerous when considering the snow and ice that may accumulate on components of the ski bike 100. Thus, the ski bike 100 utilizes a stomp plate 27 on each rear ski. The stomp plate 27 provides additional stability to the rider during operation of the ski bike 100 by providing secure footing for the rider and enabling passage of moisture that can cause slippage by the rider. For example, the textured configuration of the stomp plate 27 grips the bottom of the rider's footwear to restrict slipping, while snow an dice buildup falls through apertures in the stomp plate 27.

As described above, the ski bike 100 is lightweight and portable. Those skilled in the art will recognize that the ski bike 100 is especially useful on mountains having snow and skiing functions. A lift bar 42 attaches to the frame 2 of the ski bike 100. The lift bar 42 is configured to enable the ski bike 100 to be carried to peaks on a slope through quick-release coupling mechanism to a ski lift. In one embodiment a mount end 44 of the lift bar 42 couples to the frame 2, and a loop shaped fastening end 46 of the lift bar 42 enables a hook or line from a ski lift to detachably couple to the lift bar 42. Thus, by utilizing the novel features of the ski bike 100, even a novel rider is able to easily stand and operate the ski bike 100 while coasting down a slick slope.

Figure 1B:
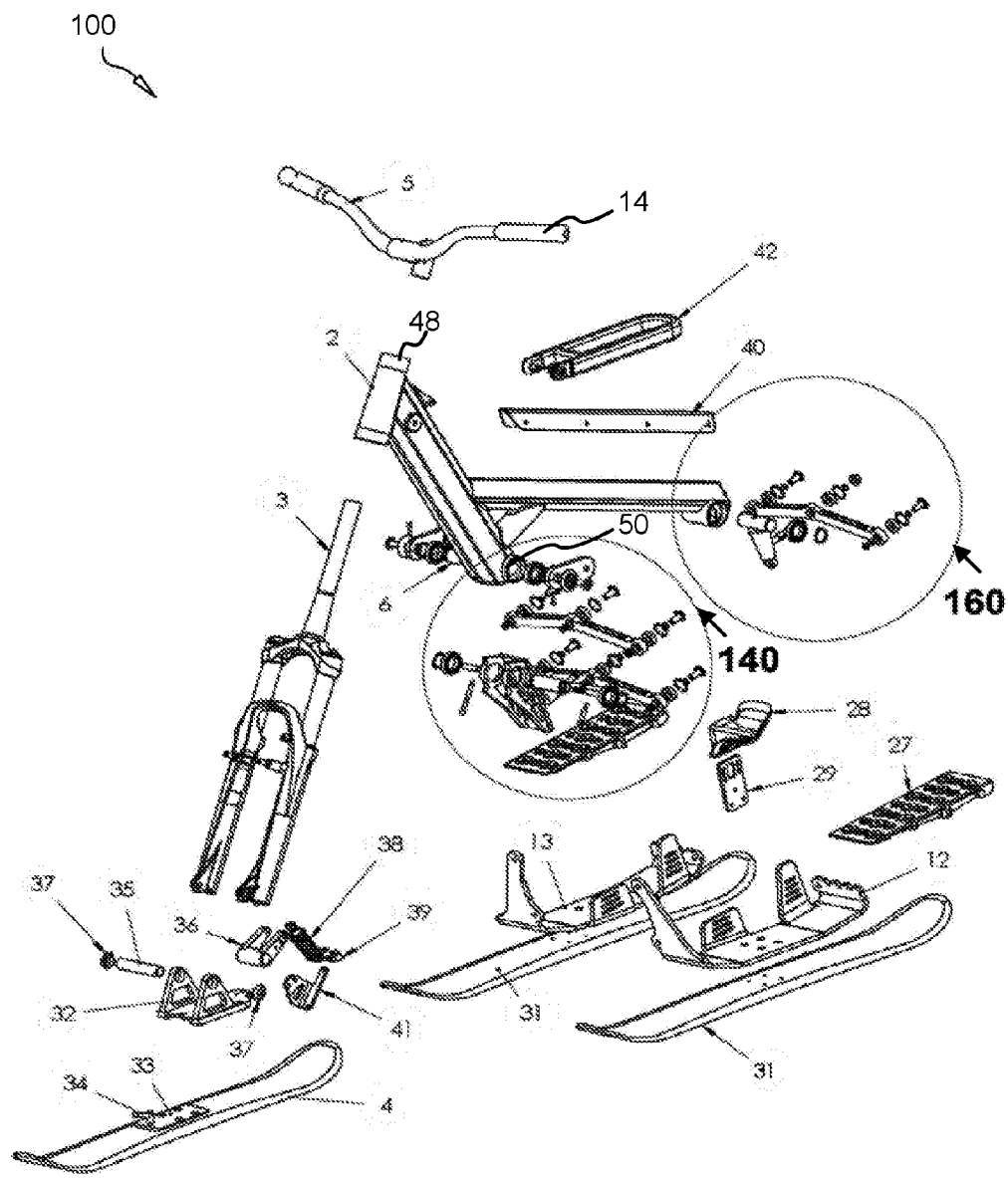
FIG. 1B is an elevational frontal-side perspective view of a diassembled ski bike in accordance with the present invention.

FIG. 1B is an elevational frontal-side perspective view of a diassembled ski bike 100 in accordance with the present invention. In one possible embodiment, the ski bike 100 comprises a modified existing frame 2, a fork 3, a front ski 4, a handle bar sub assembly 5, a shaft main pivot 6, a swingarm tower 7, a shaft link tower 8, a first control arm 9, a second control arm 10, a skate bearing 11, a ski mount 12, a ski mount 13, a link arm main 15, a front link member 16, a coil 17, a snap ring 18, a release pin 19, a release pin handle 20, a fastening pin 21, an O-ring 22, a snap washer 23, a Trek bolt 24, a tie rod end 25, a quick pin 26, a stomp plate 27, a free board binding 28, a free board binding mount 29, a side to side bumper 30, a pair of rear skis 31, a front ski bracket 32, a front ski mount side plate 33, a front fastening member 34, a front ski axle 35, a front shock pivot mount 36, a front axle spacer 37, a dampener 38, a front shock clevis 39, a spine guard 40, a front shock rotation lock 41, and a lift bar 42. These components work together to provide dampening against shock forces and precise maneuverability on the slick surface while operating the ski bike 100.

The side to side bumpers 30 provide leaning control a rider, allowing the rider to control the amount of lean permitted by the ski bike 100. The ski bike 100 allows riders to select from three predetermined levels adjustment.

Figure 1C:
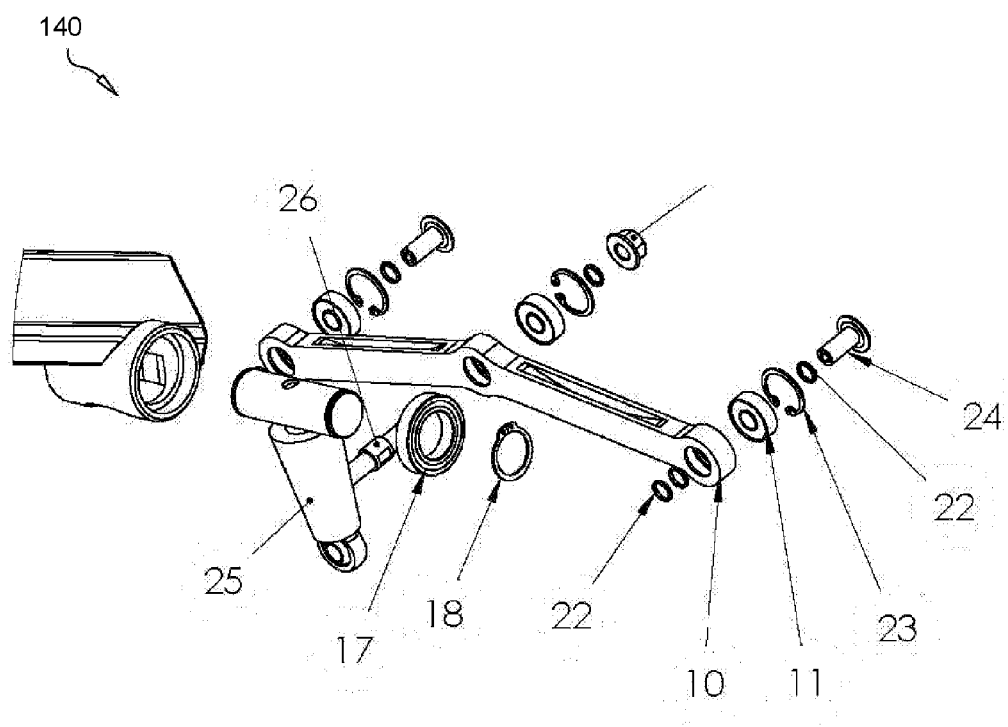
FIG. 1C is an elevational frontal-side perspective view of a diassembled subassembly of a ski bike in accordance with the present invention.

FIG. 1C is an elevational frontal-side perspective view of a diassembled subassembly 140 of a ski bike 100 in accordance with the present invention. The second control arm 10 is pictured fitting into the rear end of the frame 2. The second control arm 10 is angled such that the rear skis 31 are angled upwards relative to the horizontal. The second control arm 10 pivots with the swing arm tower 7 to enable the lateral pivoting for absorbing shock forces from the rear skis 31.

In some embodiments, a tie rod cam 25 connects the second control arm 10 to the rear end of the frame 2. A coil 17 provides stability to the tie rod cam 25. A snap ring 18 pressures the coil 17 into an opening in the tie rod cam 25. A quick pin 26 extends from the tie rod cam 25 and attaches to the second control arm 10. An O-ring 22 and a snap washer 23 are pressed coplanar to secure the second control arm 10. In one embodiment, a Trek bolt 24 may pass through a O-ring 22 and a snap washer 23. The Trek bolt 24 provides an axis for the swing arm tower 7 to pivot in relation to the control arms 9, 10. In one embodiment, the Trek bolt 24 is ten millimeters.

Figure 1D:
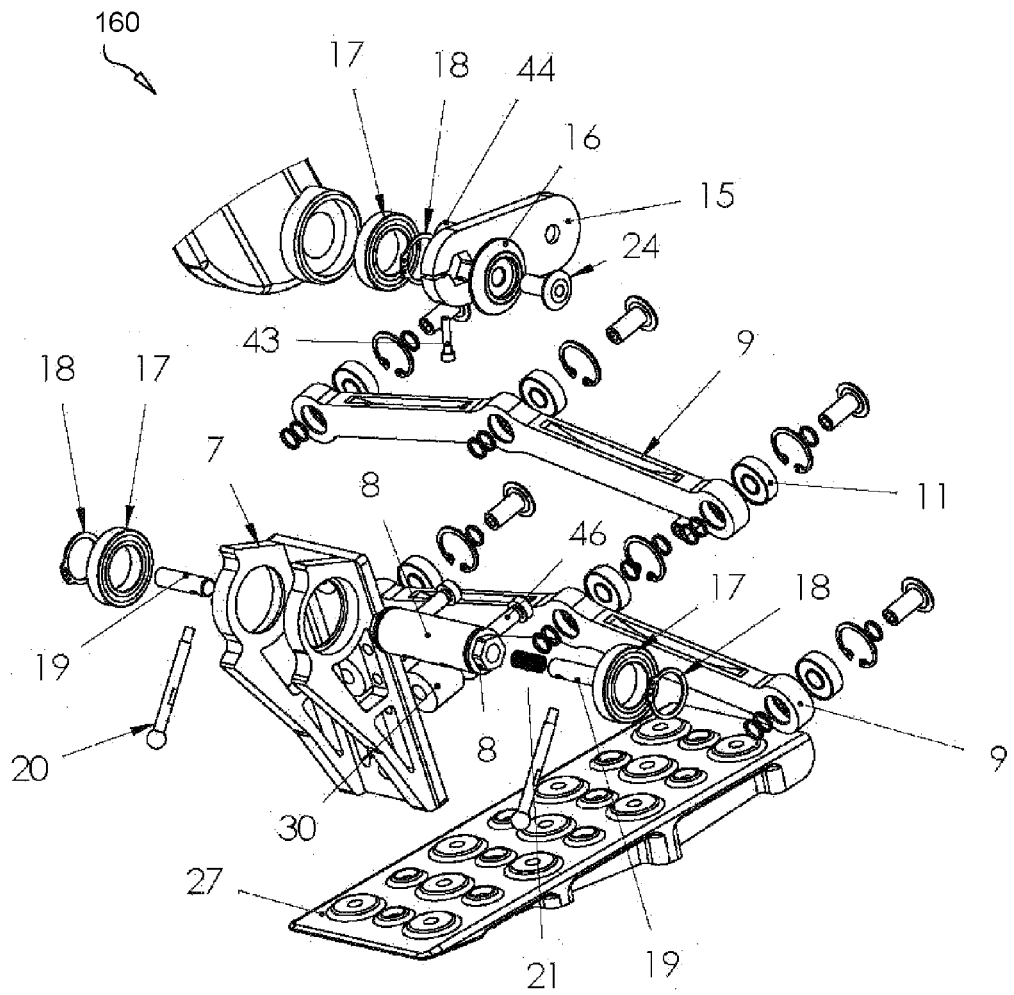
FIG. 1D is an elevational frontal-side perspective view of a diassembled subassembly of a ski bike in accordance with the present invention.

FIG. 1D is an elevational frontal-side perspective view of a diassembled subassembly 160 of a ski bike 100 in accordance with the present invention. The ski bike 100 can further include a first control arm 9 and a second control arm 10 and a first ski mount 12 and second ski mount 13. The first control arm 9 and the second control arm 10 are angled such that the rear skis 31 are angled upwards relative to a relative horizontal line, such as the slick surface. The control arms 9, 10 provide lateral stability and a framework for the swing arm tower 7 to pivot.

The subassembly 160 also or alternatively provides a quick release system which allows a ride to quickly disassemble the lower components of the ski bike 100 with a single hand by squeezing two pin handles 20 together (the lower components comprising labeled components 7, 8, 15, 16, 17, 18, 19, 20, 21, 24, 43, and 44). These levers 20 contact one or more release pins 19, allowing the one or more link arms 15 to slide when the frame 2 is lifted. This movement releases the shaft link 8. Once the shaft link 8 is free from the link arm 15, the rear tie rod end 25 can slide out the quick pin 26.

Figure 2A:
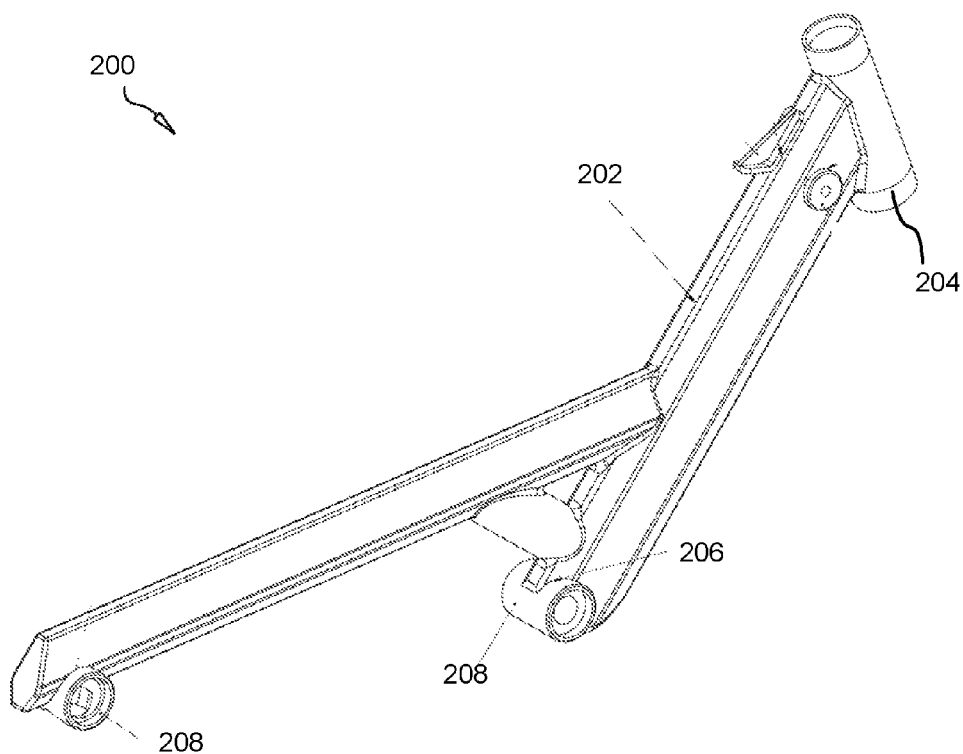
FIG. 2A is an elevational frontal-side perspective view of a ski bike frame in accordance with the present invention.

FIG. 2A is an elevational frontal-side perspective view of a ski bike 100 frame 200 in accordance with the present invention. The frame 200 is defined by a front end 202 having a tube 204. The tube 204 is configured to receive the fork 3 from one end and the handle bar sub assembly 5 from an opposite end. The rear end 206 of the frame 2 200 has a pair of horizontal tubes 208 that receive the tie rod cam 25 for connecting to the swing arm tower 7 and first and second control arms 9, 10.

Figure 2B:
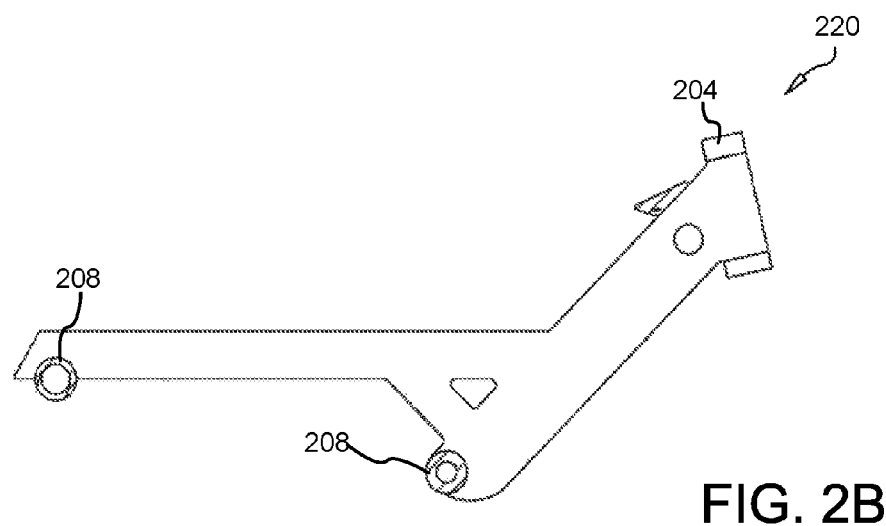
FIG. 2B is aside perspective view of a ski bike frame in accordance with the present invention.

FIG. 2B is a side perspective view of a ski bike frame 220 (an alternative embodiment of the frame 2) in accordance with the present invention. The frame 220 provides support and rigidity to the ski bike 100. The frame 220 may be constructed from a lightweight metal alloy that enables a user to maneuver the ski bike 100 easily and with minimal weight. This is especially important when operating the ski bike 100 on light snow or a thin sheet of ice.

Figure 3:
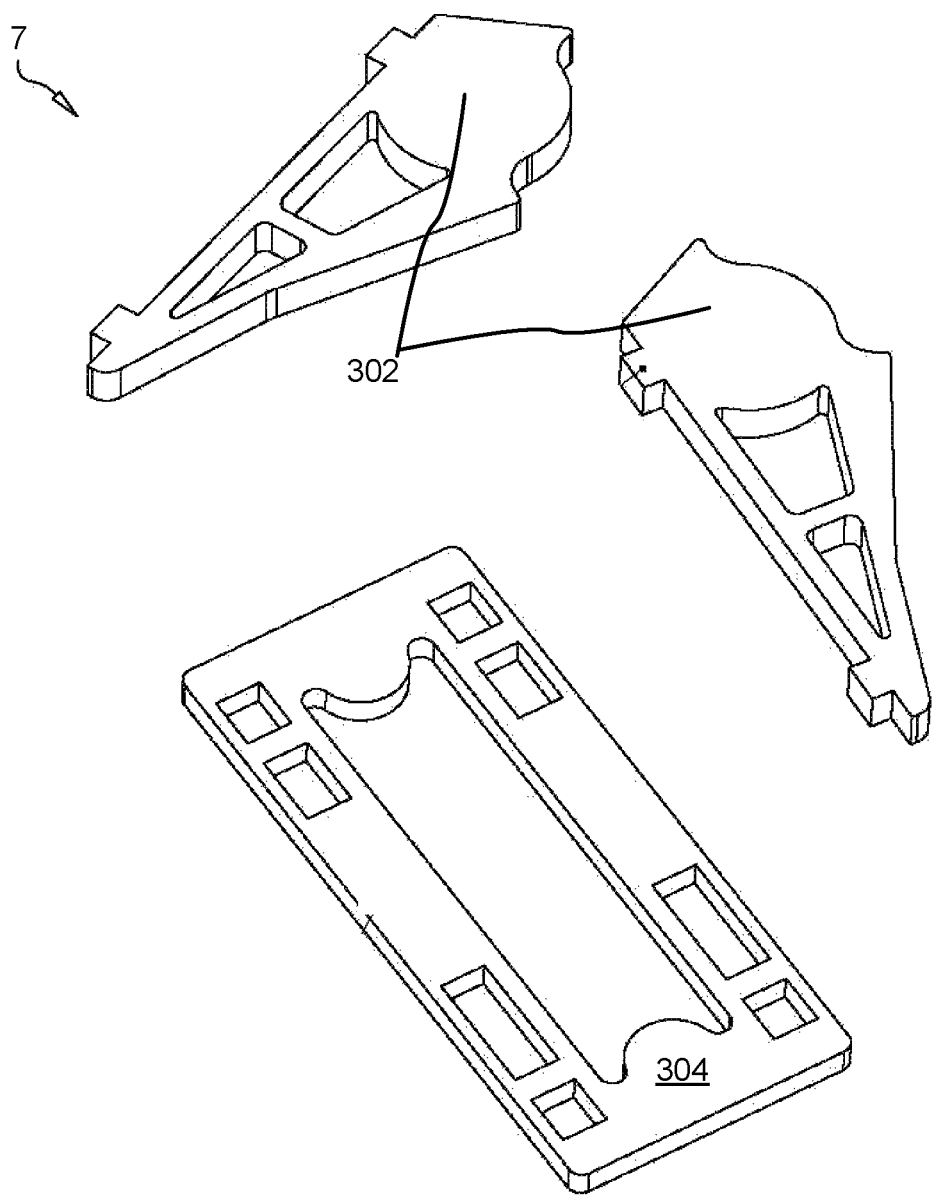
FIG. 3 is an upper perspective view of individual plates of a swing arm tower for water jet cutting in accordance with the present invention.

FIG. 3 is an upper perspective view of individual plates 302-304 of a swing arm tower 7 for water jet cutting in accordance with the present invention. The swing arm tower 7 is made up of individual plates 302-304. The plates 302-304 are dimensioned to receive other components. The plates 302-304 include multiple openings that enable passage of a shaft link tower 8, so that a smooth pivoting motion by the swing arm tower 7 is possible.

In one embodiment, the plates 302-304 are fabricated aluminum panels that are cut with a water jet cutter. Those skilled in the art will recognize that a water jet cutter is a tool capable of slicing into metal or other materials using a jet of water at high velocity and pressure, or a mixture of water and an abrasive substance. The water jet cutter is used to die the individual plates 302-304 that make up the swing arm tower 7, and also for cutting other components of the ski bike 100.

Figure 4A:
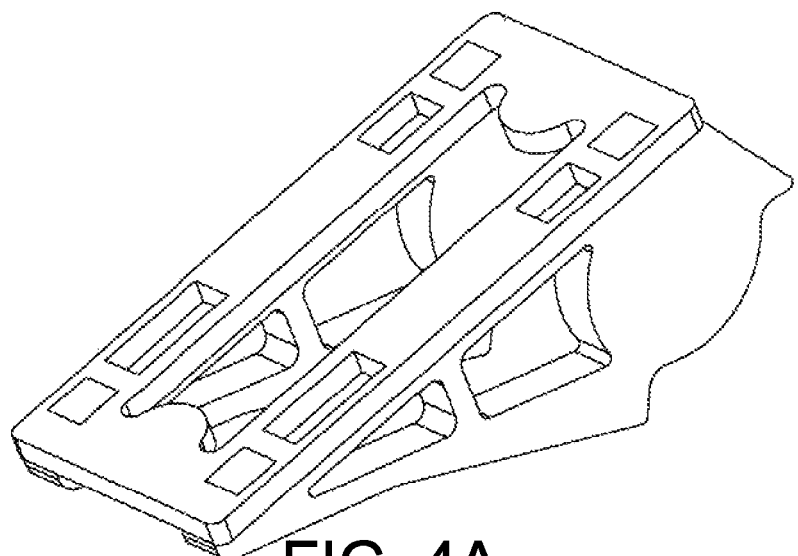
FIG. 4A is an upper perspective view of a weldment swing arm tower comprising three components in accordance with the present invention.

FIG. 4A is an upper perspective view of a weldment swing arm tower 7 comprising three components in accordance with the present invention. The plates 302-304 described above rests flush against the one surface of the swing arm tower 7. In one embodiment, the swing arm tower 7 has a substantially pyramidal shape.

Figure 4B:
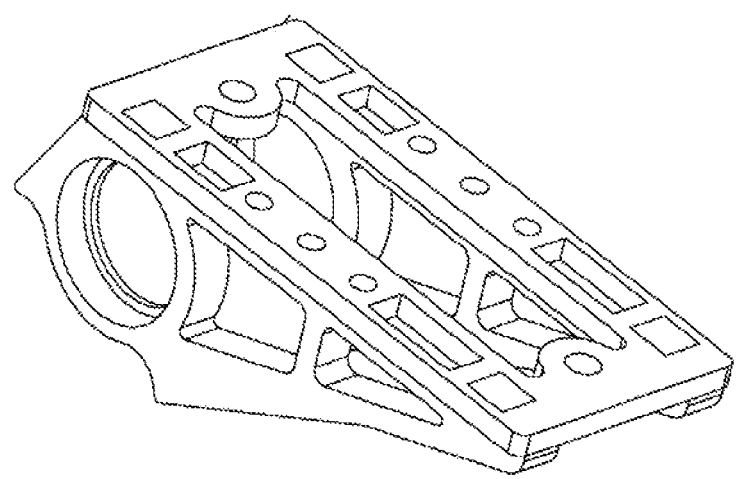
FIG. 4B is an upper perspective view of a swing arm tower made comprising components made on a CNC machine in accordance with the present invention.

FIG. 4B is an upper perspective view of a swing arm tower 7 made comprising components made on a CNC machine in accordance with the present invention. The swing arm tower 7 is configured to at least partially dampen shock forces on the pair of rear skis 31 by enabling a lateral pivoting motion, i.e., free play. A shaft link tower 8 connects the swing arm tower 7 to the first control arm 9 and the second control arm 10. The swing arm tower 7 pivots on the shaft link tower 8. A coil 17 helps regulate the pivoting motion, according to the shock forces on the pair of rear skis 31.

Figure 5:
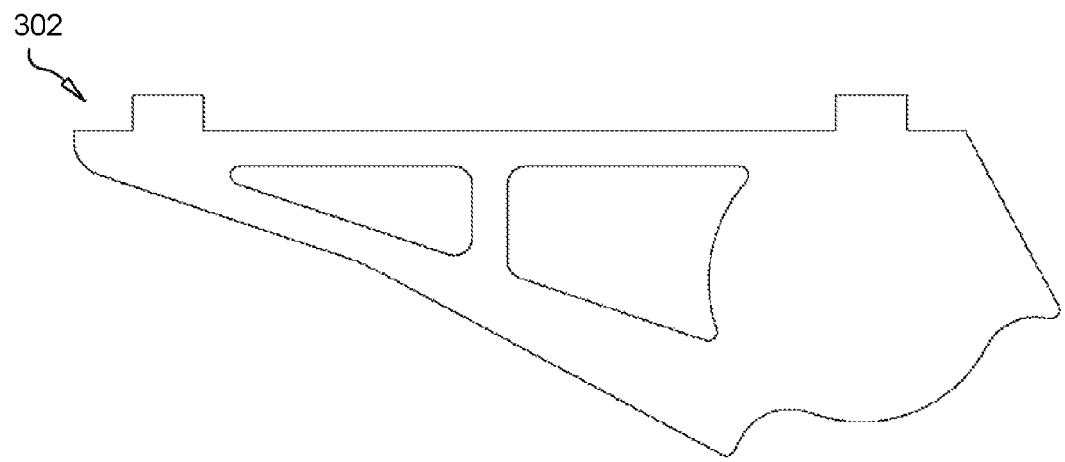
FIG. 5 is an upper perspective view of a swing arm tower component for water jet manufacture in accordance with the present invention.

FIG. 5 is an upper perspective view of a swing arm tower plate 302 for water jet manufacture in accordance with the present invention. The plate 302 can have a triangular shape and include a plurality of apertures that match openings in the surface of the swing arm tower 7. In one embodiment, the swing arm tower plate 302 is a $7/16"$ aluminum plate.

Figure 6:
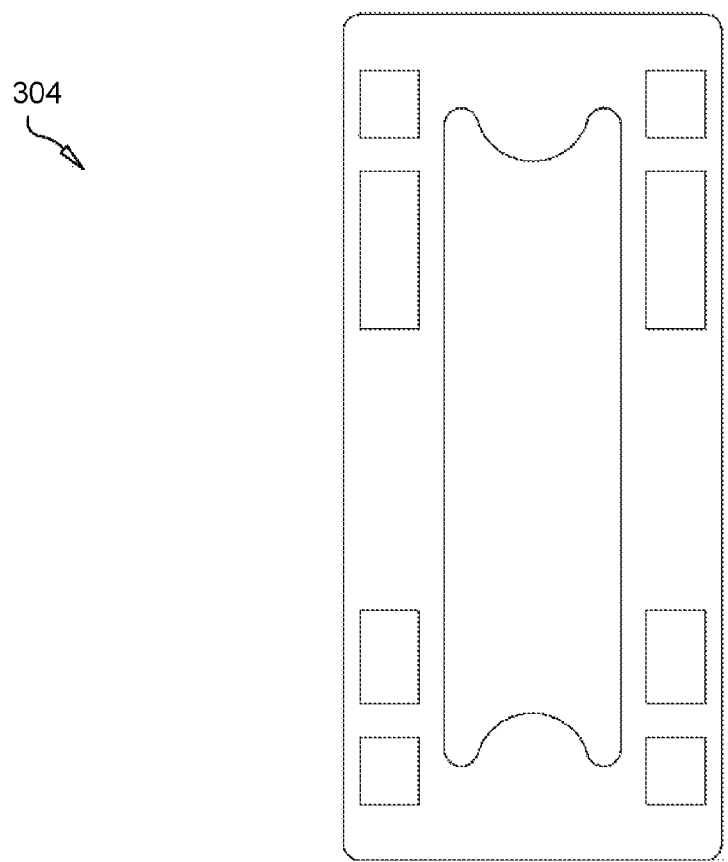
FIG. 6 is an upper perspective view of a swing arm tower component for water jet manufacture in accordance with the present invention.

FIG. 6 is an upper perspective view of a swing arm tower 7 for water jet plate 304 manufacture in accordance with the present invention. The plate 304 can have a rectangular shape and include a plurality of apertures that match openings in the surface of the swing arm tower 7. In one embodiment, the plate 304 is a $1/4"$ aluminum plate.

Figure 7:
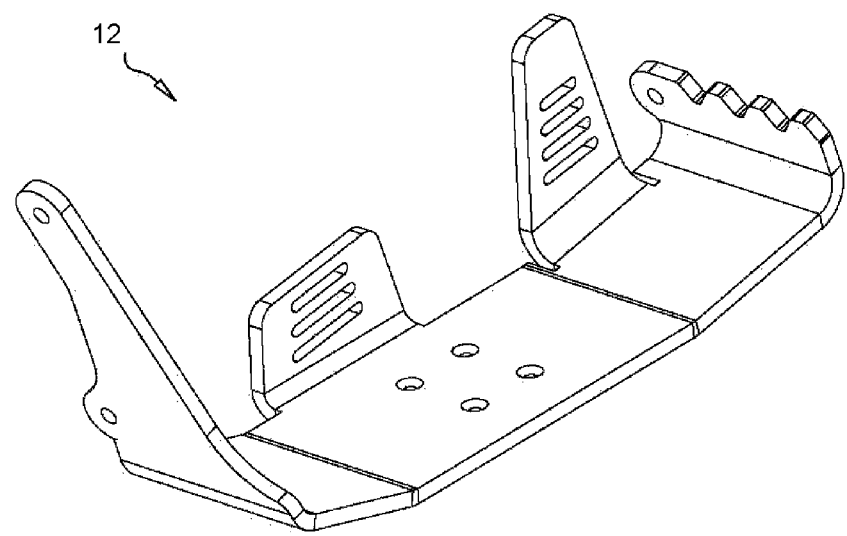
FIG. 7 is an upper perspective view of a ski mount in accordance with the present invention.

FIG. 7 is an upper perspective view of a front ski mount 12 in accordance with the present invention. The front ski 4 attaches to the fork 3 through a front ski mount 12. In one embodiment, the front ski mount 12 is a bracket having fastening points on opposite ends. A dampener 38 positions between the fork 3 and the front ski mount 12 to absorb shock during the ride. The dampener 38 may include a spring that compresses to disperse energy from the front ski 4 on the slick surface.

Figure 8:
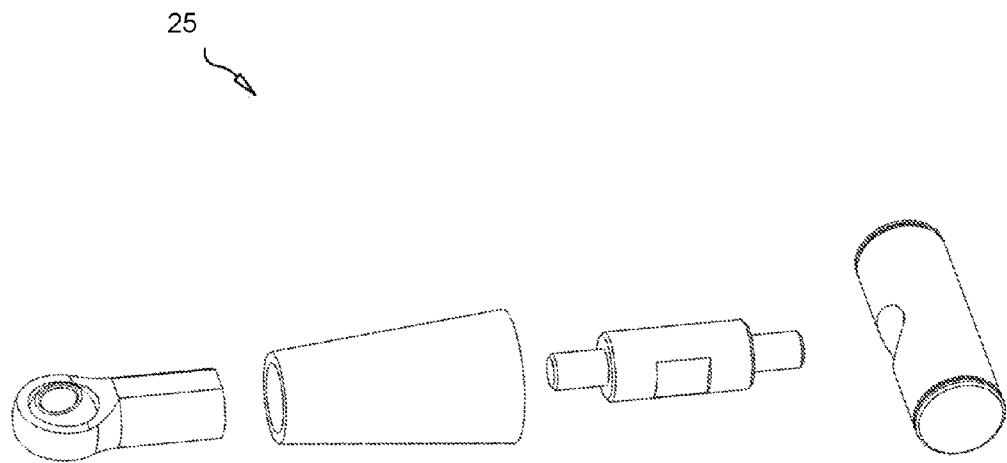
FIG. 8 is an upper-side perspective view of a tie rod cam in accordance with the present invention.

FIG. 8 is an upper-side perspective view of a tie rod cam 25 in accordance with the present invention. The tie rod cam 25 connects the first and second control arms 9, 10 to the rear end of the frame 2. A coil 17 provides stability to the tie rod cam 800. A snap ring 18 pressures the coil 17 into an opening in the tie rod cam 25. A quick pin 26 extends from the tie rod cam 25 and attaches to the second control arm 10.

Figure 9A:
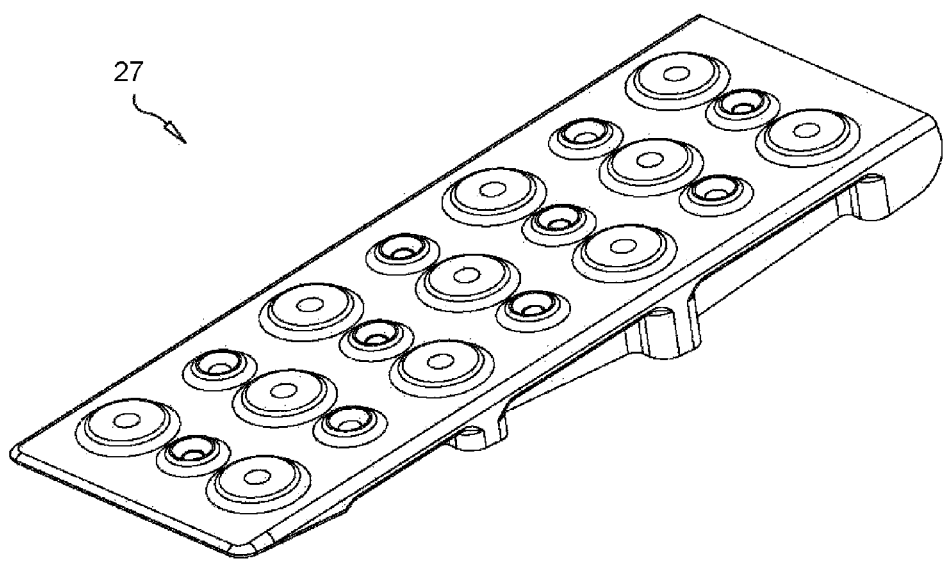
FIG. 9A is an upper-side perspective view of a stomp plate in accordance with the present invention.

FIG. 9A is an upper-side perspective view of a stomp plate 27 in accordance with the present invention. The stomp plate 27 may include a flat metal panel that rests coplanar to the ski mounts 12, 13 that attach to the support surface of the rear skis 31. In some embodiments, the stomp plate 27 may have a textured surface to provide grip, and multiple apertures to enable passage of snow and ice.

Figure 9B:
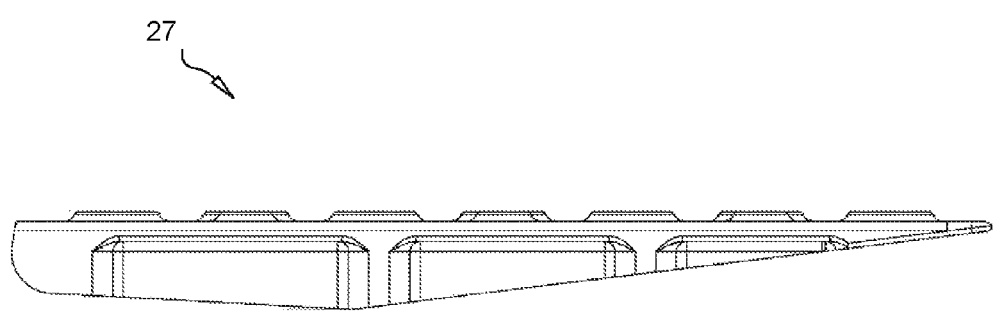
FIG. 9B is a side perspective view of a stomp plate in accordance with the present invention.

FIG. 9B is a side perspective view of a stomp plate 27 in accordance with the present invention. The stomp plate 27 forms a textured surface on which the rider stands. In this manner, the footwear of the rider grips 14 onto the textured surface of the stomp plate 27. Suitable materials for the stomp plate 27 may include, without limitation, metal alloys, aluminum, steel, titanium, and a rigid polymer.

Figure 10:
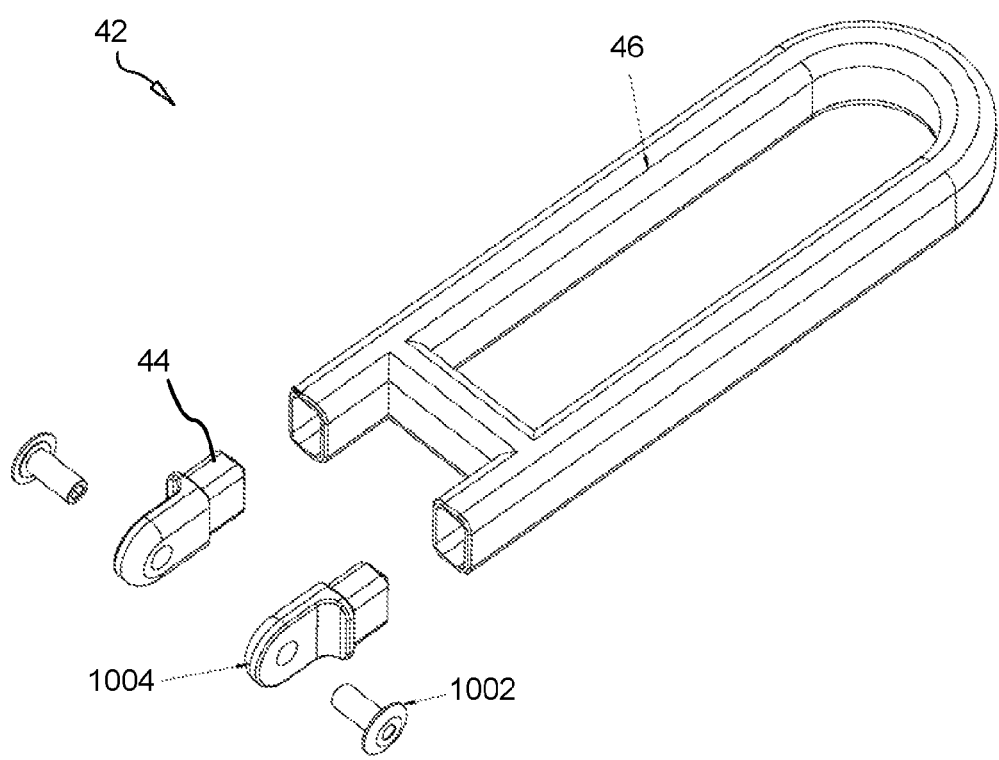
FIG. 10 is an upper-side perspective view of a lift bar in accordance with the present invention.

FIG. 10 is an upper-side perspective view of a lift bar 42 in accordance with the present invention. The lift bar 42 is defined by a mount end 44 and a generally loop shaped fastening end 46. The mount end 44 fastens to the frame 2 by means of a generally loop shaped fastening end 46. A bolt 1002 in the fastening end 46 passes through a pair of holes 1004 on the mount end 44. In this manner, a hook or line from the ski lift can pass through and couple to the lift bar 42.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ski bike comprising:
    a frame, the frame defined by a front end and a rear end, the frame configured to provide support and structural integrity to the ski bike;
    a handle bar sub assembly, the handle bar sub assembly configured to attach to the front end of the frame, the handle bar sub assembly further configured to enable rotatable maneuvering of the ski bike;

a fork, the fork configured to extend from the front end of the frame;

a front ski, the front ski defined by a front support surface, a front gliding surface, and a generally curved edge, the front support surface configured to attach to the fork, the front gliding surface configured to minimize frictional forces, the generally curved edge configured to enable maneuvering of the ski bike;

a dampener, the dampener disposed between the fork and the front ski, the dampener configured to at least partially dampen axial shock forces on the front ski;

a front shock pivot mount, the front shock pivot mount configured to enable lateral pivoting of the front ski, wherein the pivoting motion at least partially dampens lateral shock forces on the front ski;

a pair of rear skis, the pair of rear skis defined by a rear support surface, a rear gliding surface, and a generally curved edge, a rear upper surface configured to attach to the rear end of the frame, the rear gliding surface configured to minimize frictional forces, the generally curved edge of the pair of rear skis configured to enable maneuvering of the ski bike, the pair of rear skis disposed in a spaced-apart relationship, wherein the front ski and the pair of rear skis form three terminal points extending from the frame of the ski bike;

a swing arm tower, the swing arm tower configured to join with the pair of rear skis, the swing arm tower configured to enable lateral pivoting of the pair of rear skis, wherein the pivoting motion at least partially dampens lateral shock forces on the pair of rear skis;

a stomp plate, the stomp plate defined by a generally textured surface and multiple apertures, the stomp plate disposed coplanar to the rear support surface of a rear ski, the stomp plate configured to restrict slippage and enable passage of moisture; and a lift bar, the lift bar defined by a mount end and a generally loop shaped fastening end, the mount end configured to attach to the frame, the generally loop shaped fastening end configured to provide a surface for enabling the ski bike to be lifted;

wherein the ski bike is operable on a slick surface;

wherein the frame is fabricated from a rigid, lightweight metal;

a spine guard, the spine guard configured to overlay the frame along a longitudinal axis;

wherein the handle bar sub assembly comprises a pair of grips, the pair of grips configured to enable gripping the handle bar sub assembly for maneuvering the ski bike;

wherein the front end of the frame comprises a tube, the tube configured to receive an upper end of the fork;

wherein the handle bar sub assembly is configured to pass through the tube of the frame;

a front ski mount side plate, the front ski mount side plate configured to attach to the front support surface of the front ski;

a front ski bracket, the front ski bracket configured to join the front ski mount side plate to the front ski;

a front fastening member, the front fastening member configured to secure the front ski mount side plate to the front support surface of the front ski;

a front shock clevis, the front shock clevis configured to detachably attach the front shock pivot mount to the front ski mount side plate, wherein the front shock clevis is a U-shaped connector within which the front shock pivot mount can be fastened by means of a bolt or pin passing through the ends of the connector.

2. The ski bike of claim 1, further including a front ski axle, the front ski axle configured to join the front shock pivot point to the front end of the frame.

3. The ski bike of claim 2, wherein the dampener is a spring.

4. The ski bike of claim 3, further including a first ski mount and a second ski mount, the first ski mount and the second ski mount configured to rest coplanar to the rear support surface of a rear ski.

5. The ski bike of claim 4, wherein the swing arm tower is configured to attach to the first ski mount and the second ski mount.

6. The ski bike of claim 5, further including a free board binding, the free board binding configured to support footwear from a rider on the pair of rear skis.

7. The ski bike of claim 6, further including a free board binding mount, the free board binding mount configured to fasten the free board binding to the rear support surface of the pair of rear skis.

8. The ski bike of claim 7, further including a first control arm and a second control arm.

9. The ski bike of claim 8, further including a link arm main, the link arm main configured to join the first control arm and the second control arm to the rear end of the frame.

\* \* \* \* \*